US006918275B2

(12) United States Patent
Martus et al.

(10) Patent No.: US 6,918,275 B2
(45) Date of Patent: Jul. 19, 2005

(54) MANUAL INTERNAL RELEASE ASSEMBLY FOR A VEHICLE DECKLID LATCH

(75) Inventors: Charles R. Martus, Oxford, MI (US); Scott L. Loring, Lapeer, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/629,728

(22) Filed: Jul. 28, 2003

(65) Prior Publication Data

US 2005/0022567 A1 Feb. 3, 2005

(51) Int. Cl.[7] .......................... E05B 65/12; B60R 25/00

(52) U.S. Cl. .......................... 70/240; 70/256; 70/279.1; 292/125; 292/225; 292/DIG. 29; 292/DIG. 43

(58) Field of Search .......................... 70/240, 241, 256, 70/279.1; 292/28, 38, 50, 125, 133, 141, 171, 225, 235, DIG. 29, DIG. 43

(56) References Cited

U.S. PATENT DOCUMENTS 1,788,473 A * 1/1931 Smith .......................... 70/170
1,857,654 A * 5/1932 Mylar .......................... 70/165
1,918,093 A * 7/1933 Gang .......................... 70/255
3,062,033 A * 11/1962 Schmalfeldt .................. 70/256
4,907,428 A * 3/1990 Nakashima et al. .......... 70/264
5,052,204 A * 10/1991 Millar .......................... 70/256
5,535,608 A * 7/1996 Brin ............................ 70/256
5,894,749 A * 4/1999 Tomaszewski et al. ....... 70/240
5,931,033 A * 8/1999 Lanigan et al. ............... 70/256
6,598,436 B2 * 7/2003 Ponn et al. .................. 70/256
6,623,071 B2 * 9/2003 Kawamoto et al. .... 297/195.13
2002/0162369 A1 * 11/2002 Lurie et al. .................. 70/256

* cited by examiner

*Primary Examiner*—Lloyd A. Gall
(74) *Attorney, Agent, or Firm*—Roger A. Johnston

(57) ABSTRACT

A combination key lock and latch assembly for a vehicle trunk lid having the key lock located separately and closely adjacent the latch assembly without requiring modification of an existing latch assembly. A sliding actuator is attached to an existing latch assembly without requiring modification. The key lock includes a projecting arm for rotation upon user rotation of the key lock; and, the arm contacts a projection on the sliding actuator for affecting movement and release of the latch. The latch assembly may be manually released from inside the trunk by moving the projection on the sliding actuator.

10 Claims, 3 Drawing Sheets

MANUAL INTERNAL RELEASE ASSEMBLY FOR A VEHICLE DECKLID LATCH

BACKGROUND OF THE INVENTION

The present invention relates to devices for manually releasing a decklid latch in a vehicle and more particularly relates to devices for manually releasing the lid latch for the trunk. Presently it is required that manufacturers of motor vehicles provide an internal manual release for the latch on the vehicle trunk lid which is accessible within the trunk compartment.

In vehicle trunk lid latch arrangements, it is common to have a key lock assembly, operable by the user inserting a key from the exterior of the trunk lid, provided with a member extending externally of the lock mechanism on the interior of the trunk for actuating the latch assembly which engages the corresponding trunk structure for latching upon closing of the trunk lid. Alternatively the key lock is co-located with the latch assembly. Typically, the latch assembly is a common part used on a variety of vehicle models by any particular vehicle manufacturer. The latch assembly is generally located on the vehicle center line for symmetric engagement with a correspondingly located member on the vehicle structure for securing the decklid in the closed position.

Numerous vehicle models have the key lock located remotely from the latch assembly and connected to the latch assembly by intermediate devices such as rods or tension cables. Alternatively, where it is desired to locate the key lock separately yet spaced closely adjacent or in close proximity to the latch mechanism, it has been found difficult to interconnect the key lock to the latch assembly utilizing an existing latch assembly intended for connection to a remotely located key lock. This problem is further complicated where it is desirable to use a non-standard key lock having a configuration which minimizes the protrusion of the key lock into the trunk space. Therefore, it has been desired to provide a low cost and easy to install combination of closely spaced key lock and existing lid latch assembly that does not require modification of the existing latch assembly.

BRIEF SUMMARY OF THE INVENTION

The present invention provides a solution to the above described problem by employing a slide type actuator which may be attached externally to an existing decklid latch assembly. The actuator has a portion thereof engaged by a rotating member attached to the key lock such that user insertion of a key and rotation of the key lock causes a rotating arm member to engage and move the slide and release the latch assembly to permit opening of a decklid. The sliding actuator of a present invention comprises a spring loaded piston in a cylindrical casing which has a projection from the piston extending externally of the casing through a slot provided therein. The projection is contacted by the rotating arm attached to the key lock assembly. The projection may be manually contacted and moved to effect release of the latch from the interior of the trunk conditions. The arrangement of the present invention thus permits a key lock to be located adjacent or in close proximity to an existing latch mechanism and permits the key lock to engage the sliding actuator without requiring modification of the existing latch mechanism and also permits internal manual release.

DETAILED DESCRIPTION OF THE INVENTION

Figure 1:
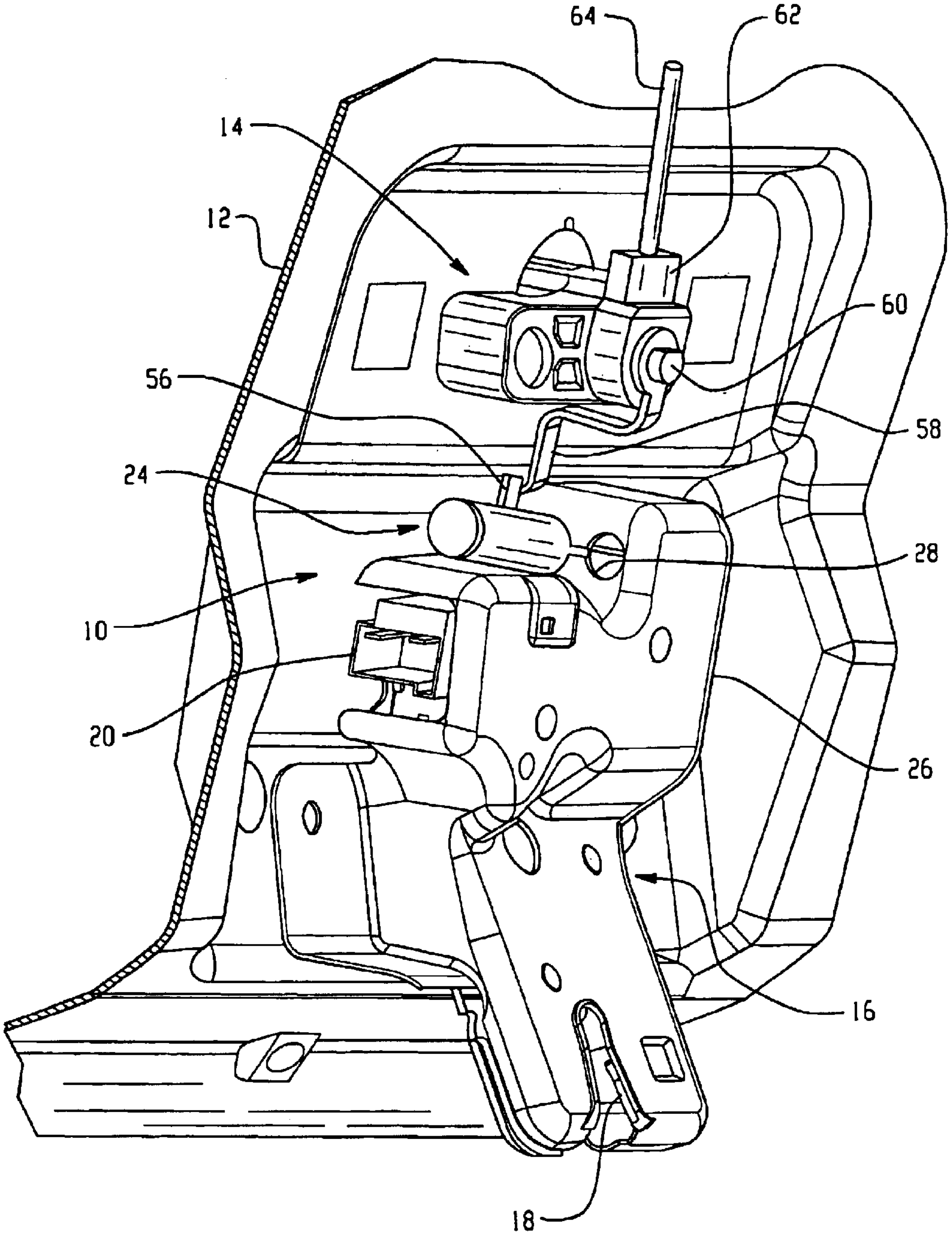
FIG. 1 is a perspective view of a key lock and latch assembly installed on a vehicle trunk decklid.
Figure 2:
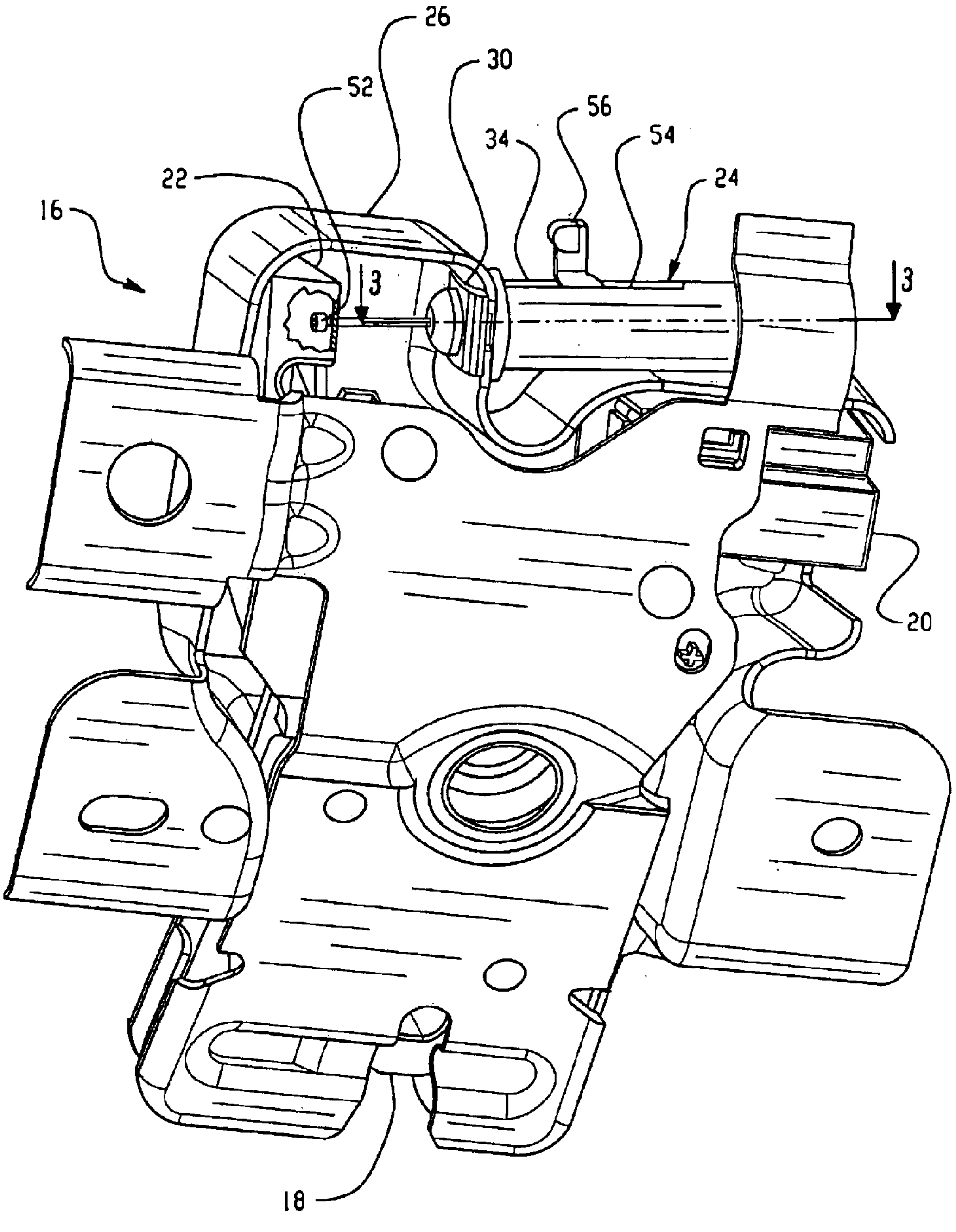
FIG. 2 is a backside view of the latch mechanism and actuator portion of the assembly of FIG. 1.

Referring to FIGS. 1 and 2, the assembly of the invention indicated generally at 10 is shown installed on a movable lid structure 12 as may be employed in the closure for a vehicle trunk. The combination 10 in the present invention includes a key lock mechanism or assembly indicated generally in 14 which is operated by user insertion of a key on the reverse side of the decklid into a lock such as the cylinder lock (not shown) in a manner well known in the art.

The combination 10 further includes a releasable latch assembly indicated generally at 16 which has a releasable latch 18 which is adapted to engage a locking surface (not shown) provided on the vehicle body such as, for example, a locking bar on the inside of the trunk compartment. The latch mechanism 18 is releasable electrically or manually as will hereinafter be described in greater detail.

An electrical connector 20 is provided on the latching assembly 16 and is adapted for connecting to an unshown wire harness for effecting remote release of the latching assembly through an unshown operating mechanism, typically a solenoid, operatively connective to the latch mechanism 18. The latching assembly 16 includes a moveable member 22 such as a pivoted lever which is also internally connected to the latch mechanism 18 for effecting release movement thereof.

Figure 3:
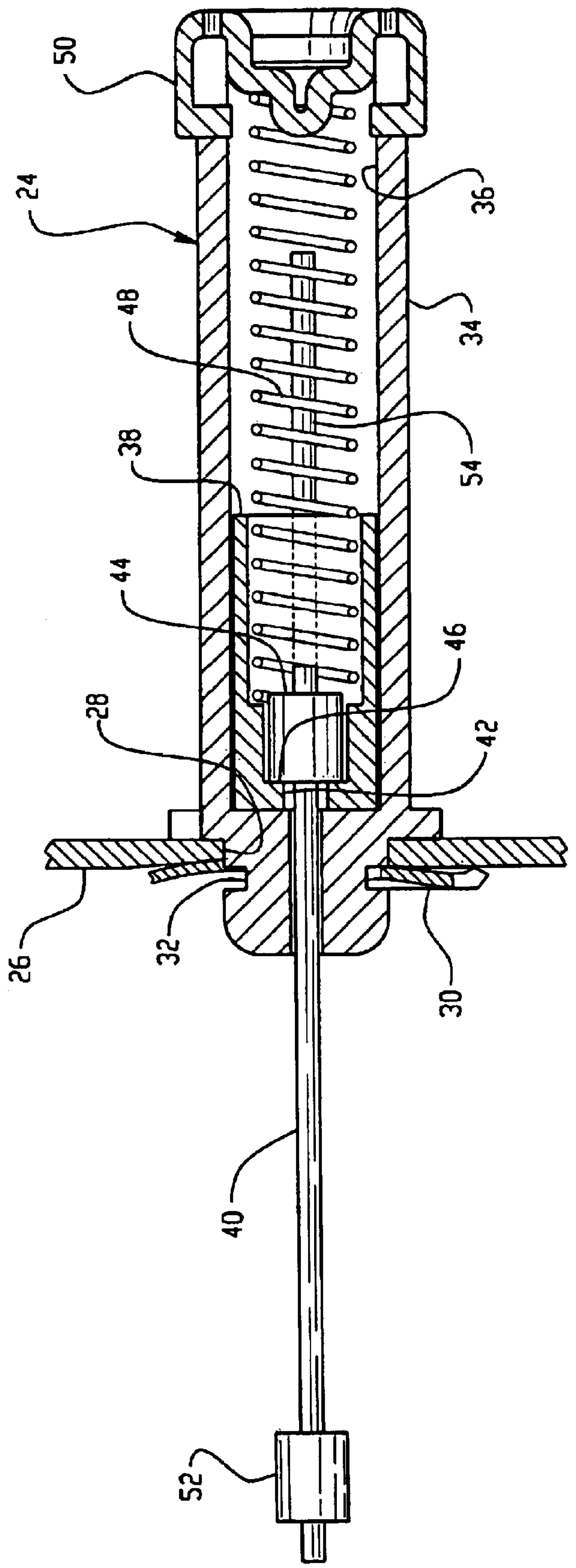
FIG. 3 is a section view taken along section indicating lines 3—3 of FIG. 2.

Referring to FIGS. 1 through 3, assembly 16 also includes an actuator assembly indicated generally at 24 which is mounted to the housing 26 of the assembly 16 through an aperture 28 (see FIG. 1) and secured therein by retaining clip 30 received in a groove 32 formed in the end of the actuator housing 34.

Actuator 24 includes a bore 36 with a piston 38 slidably disposed therein with a tension cable 40 received through an aperture 42 formed in the piston. A retainer, such as a ferrule 44 is attached to the end of the cable 40 which registers against a shoulder 46 formed in the piston. The piston 38 is biased in a direction to oppose tension in the cable 40 by one end of a spring 48 which has its opposite end registering against a closure or tab 50 received over the end of the housing secured on the end of the housing 34 remote from the housing 26. The end of the cable 40 extending outwardly from housing 34 is also provided with a ferrule 52 which it will be understood has one side thereof registered against the moveable member 22 in a manner well known in the art for affecting tension on the cable 40 and movement of member 22.

Housing 34 has a slot 54 formed therein extending longitudinally thereof with a follower or projection 56 extending outwardly from the piston 38 through slot 54 and is guided for sliding movement therein.

Referring to FIG. 1, the projection 56 is contacted by the end of a rotating arm 58 which is attached to the end of a rotary member or shaft 60 extending outwardly from the key lock assembly 14. It will be understood that the shaft 60 is rotated by user insertion of a key in the key lock assembly 14 and rotation of the key which effects rotary movement of the arm 58 and sliding movement of the piston 38 which in turn acts against the ferrule 44 and exerts tension on the cable 40 for movement of the member 22 to effect release of the latch 18.

Manual release is affected by pushing the projection 56 in a direction tensioning cable 40 to release latch 18.

The present invention thus provides a simple effective and relatively low cost way of providing for key lock release of an existing latching mechanism where it is desired to locate the key lock closely adjacent to the latching mechanism but not directly therein in a manner which eliminates the need for modification of the existing latching mechanism.

Although the invention has hereinabove been described with respect to the illustrated embodiments, it will be understood that the invention is capable of modification and variation and is limited only by the following claims.

What is claimed is:

1. In combination a keylock and latch assembly with a vehicle decklid comprising:

(a) a key operated lock including an arm extending radially outwardly therefrom and rotatable with the lock upon user insertion of a key therein;

(b) a releasable latch assembly including a housing disposed proximate said lock with a release cable extending from said latch assembly and operable to secure the decklid upon closure;

(c) a follower attached to said release cable and including means attached to said latch assembly housing operable for guiding the follower for linear movement in the direction of tensioning the cable, said follower including a surface portion thereof disposed for contact by said arm, whereupon user rotation of the lock, said arm is operable to effect movement of the follower and tensioning of the release cable for effecting actuation of said releasable latch assembly.

2. The combination defined in claim 1, wherein said means operable for guiding the follower includes a housing.

3. The combination defined in claim 1, wherein said means operable for guiding the follower includes a housing with said follower slidably received in the housing and said contact portion extending outwardly therefrom.

4. The combination defined in claim 3, wherein said housing includes a spring biasing said follower in a direction opposing tensioning of the cable.

5. The combination defined in claim 3, wherein said housing includes a slot with said contact portion extending therethrough.

6. The combination defined in claim 1, wherein said means operable for guiding the follower includes a tubular housing; and, said follower includes a piston slidably received in said tubular housing.

7. The combination defined in claim 6, wherein said piston includes a projection extending outwardly through said housing with the projection including said contact portion.

8. The combination defined in claim 1, wherein said lock includes a rotary member, extending therefrom and rotatable with said key; and, said arm is attached to said rotary member for rotation therewith.

9. The combination defined in claim 1, wherein said lock and said releasable latch assembly are disposed on the vehicle decklid.

10. The combination defined in claim 1, wherein said means operable for guiding the follower includes a tubular housing with said follower slidably received thereon and including a bias spring and a cap disposed for closing said tubular housing, and operable to retain said spring.

* * * * *